Patented May 27, 1952

2,598,642

UNITED STATES PATENT OFFICE 2,598,642

PROCESS OF AROMATIZING HYDROCARBONS WITH METAL FLUORIDE CATALYST IN PRESENCE OF OXYGEN AND HYDROGEN FLUORIDE

Forrest R. Hurley, Jamestown, Ohio, assignor to Monsanto Chemical Company, St. Louis, Mo., a corporation of Delaware No Drawing. Application September 24, 1949, Serial No. 117,740

6 Claims. (Cl. 260—673.5)

This invention relates to the conversion of straight chain hydrocarbons into closed chain or cyclic hydrocarbons.

More specifically it is directed to a process involving the use of particular catalysts under conditions in which the catalyst may be continuously regenerated and maintained in a condition of high catalytic activity.

It is generally recognized that in most catalytic processes a continuous degeneration of the catalytic activity occurs because of the accumulation of by-products on the surface of a catalyst which thereby decreases in activity in the desired chemical reaction. It is an object of the present invention to provide a catalytic method whereby cyclicization and aromatization reactions may be carried out over catalysts which may be regenerated continuously during the operation of the chemical process. It is also an object to provide a method whereby such catalytic reactions may be carried out while maintaining the catalyst in a state of high activity.

According to the present invention, aliphatic or straight chain hydrocarbons, such as n-heptane may be cyclicized or converted into cyclic compounds such as toluene. The present invention is characterized by the use of particular halogen-containing metal catalysts, such as the various combinations of iron and manganese fluorides, described in copending application Serial No. 117,739, filed September 24, 1949, and assigned to the same assignee as is the present patent application. The iron-manganese fluorides are employed over a wide range of proportions in which the iron may be present to the extent of from 10% to 90% calculated as the weight of the metallic constituents of the above catalytic combination. The iron-manganese fluorides may be utilized in massive form as crystalline or amorphous materials, or may be dispersed upon inert catalytic carriers, such as charcoal, alumina, silica and the like.

It has now been discovered that cyclicization reactions may be carried out while preserving the high activity of the catalyst if the hydrocarbon feed over the fluoride catalyst is provided to maintain a condition in which particular proportions of oxygen and of hydrogen fluoride are present in the incoming gases. This condition is essential to preserve high catalytic activity, since it has been discovered that the catalyst surface may be swept clean and maintained in an active condition by the introduction of small amounts of oxygen which apparently serve to promote the oxidation of the metallic components of the catalyst combination. However, the presence of hydrogen fluoride in excess over the oxygen prevents the formation of irreversible metallic oxides. The hydrogen fluoride may be present in the range of 1.5% to 40% by volume of the entering gas feed, a preferred range being 1.5% to 10%. The hydrogen fluoride serves to reform the fluorides of iron and manganese so that a constant regeneration of the active catalytic constituents is provided. The process of the present invention may be carried out by the use of concentrations of oxygen of from 1% to 40% by volume of the gas feed, and may also be accomplished by the introduction of air in the gas mixture.

The catalyst may be subjected to an activation step in which the above gases may be fed in the same ratios without the addition of hydrocarbons. The activation is conducted under conditions of excess gaseous hydrogen fluoride, so that the fluorides of the active chemical constituents of the catalyst may be formed. In the subsequent carrying out of the chemical reaction in which aliphatic hydrocarbons are cyclicized to cyclic compounds, the addition of oxygen and of hydrogen fluoride is desirably maintained at a lower value in the range described above, such as 1% of oxygen and 1.5% of hydrogen fluoride by volume in the entering feed gases.

Typical results obtainable in carrying out an aromatizing reaction are illustrated in the following examples which are, however, not limitative as to the scope of the invention.

Example 1

A ferric manganous fluoride catalyst, such as is prepared in accordance with the disclosure of the copending patent application described above, is provided as a fixed bed in a catalytic reactor. The catalytic reactor is also provided with a feed system to introduce n-heptane and for the introduction of air and of hydrogen fluoride in measured proportions. A collection system is also provided in which the gaseous and liquid products are collected. n-Heptane is vaporized and passed over the granular catalyst comprising the massive form of ferric-manganous fluorides. The catalyst is maintained at 525°–560° C. at atmospheric pressure and a contact time of 20 seconds is employed. The product is found to contain a considerable proportion of an aromatic fraction, consisting of 42% unsaturated material corresponding to toluene. Examination of the fraction by means of infra-red absorption and ultra-violet absorption methods indicates the product to be preponderantly toluene.

Example 2

A sample of ferric-manganese fluoride obtained by the reaction of oxygen and hydrogen fluoride upon a mixture of ferrous and manganous hydroxides is employed in a cyclicization reaction. The active catalyst contains approximately 50% of ferric fluoride and 50% of manganous fluoride. A feed gas containing 90% of n-heptane, 5% air and 5% hydrogen fluoride is passed over the catalyst which is maintained at about 550° C. It has been found that the cyclicization reaction may be carried out at temperatures in the range of 450° to 600° C. The products of the catalytic reaction are separated into fractions consisting of unreacted n-heptane, an aromatic cut and heavier bottoms. The aromatic cut is found to consist largely of toluene.

It has also been found to be desirable to operate under conditions in which the oxygen and hydrogen fluorides are present in a total proportion of less than 10%, and in which the hydrogen fluoride is in volumetric excess over the said oxygen.

Since many changes may be made in the above process and catalyst without departing from the scope of the invention, it is intended that all matter contained in the above description shall be illustrative, and not in a limiting sense, and that the invention is to be construed broadly and restricted solely by the scope of the prior art and spirit of the appended claims.

What is claimed and is desired to be protected by Letters Patent of the United States is:

1. A process for the production of cyclic hydrocarbons from n-heptane which comprises contacting n-heptane with a dehydrocyclicization catalyst comprising the combination of manganese fluoride and iron fluoride in which the proportion of iron calculated as the metal is from 10 percent to 90 percent by weight of the iron and manganese present in the said catalyst, at a temperature of from 450° to 600° C. in the presence of minor proportions of oxygen and of hydrogen fluoride.

2. A process for the production of aromatic hydrocarbons from n-heptane which comprises contacting n-heptane with a dehydrocyclicization catalyst comprising manganese fluoride and iron fluoride in which the proportion of iron calculated as the metal is from 30 percent to 60 percent by weight of the iron and manganese present in the said catalyst at a temperature of from 500° to 550° C. in the presence of oxygen and hydrogen fluoride, which latter two constituents are present in a total proportion of less than 10 percent and in which the said hydrogen fluoride is in volumetric excess of the said oxygen.

3. A process for the preparation of aromatic hydrocarbons in accordance with claim 2 in which the said cyclicization catalyst is dispersed upon an inert carrier.

4. A process for the preparation of aromatic hydrocarbons in accordance with claim 3 in which the said catalyst is dispersed upon an inert carrier of the group consisting of charcoal, alumina and silica.

5. A process for the production of aromatic hydrocarbons from n-heptane which comprises contacting n-heptane with a dehydrocyclicization catalyst comprising the combination of manganese fluoride and iron fluoride in which the proportion of iron calculated as the metal is from 10 percent to 90 percent by weight of the iron and manganese present in the said catalyst at a temperature of from 450° to 600° C. in the presence of oxygen in the range of one percent to 10 percent by volume of the gas fed to the catalyst, and in the presence of hydrogen fluoride in the range of from 1.5 percent to 40 percent by volume of the gas fed to the said catalyst and in which the said hydrogen fluoride is present in volumetric excess over the oxygen.

6. A process for the production of toluene from heptane which comprises contacting heptane with a dehydrocyclicization catalyst comprising the combination of manganese fluoride and iron fluoride in which the proportion of iron calculated as the metal is from 30 percent to 60 percent by weight of the iron and manganese present in the said catalyst, at a temperature of from 500° to 550° C. in the presence of oxygen in the range of 1 percent to 10 percent by volume of the gas fed to the catalyst, and hydrogen fluoride in the range of 1.5 percent to 40 percent by volume of the gas fed to the catalyst, and in which the said hydrogen fluoride is present in volumetric excess over the oxygen.

FORREST R. HURLEY.

REFERENCES CITED

The following references are of record in the file of this patent:

UNITED STATES PATENTS

| Number | Name | Date |
| --- | --- | --- |
| 2,337,190 | Greensfelder et al. | Dec. 21, 1943 |
| 2,421,677 | Belchetz | June 3, 1947 |
| 2,423,328 | Layng | July 1, 1947 |